United States Patent [19]

Merval et al.

[11] Patent Number: 5,387,653
[45] Date of Patent: Feb. 7, 1995

[54] THERMOPLASTIC POLYAMIDE/POLYETHERESTERAMIDE POWDERS FOR THE DIRECT COATING OF METAL SUBSTRATES

[75] Inventors: Jean-Paul Merval, Brionne; Jean-Yves Peschard, Serquigny, both of France; Stephen Rennie, London, England

[73] Assignee: Atochem, Puteaux, France

[21] Appl. No.: 100,192

[22] Filed: Aug. 2, 1993

Related U.S. Application Data

[63] Continuation of Ser. No. 815,847, Dec. 3, 1991, abandoned, which is a continuation of Ser. No. 191,871, May 9, 1988, abandoned.

[30] Foreign Application Priority Data

May 7, 1987 [GB] United Kingdom ................ 8710748

[51] Int. Cl.$^6$ ............................................. C08L 77/00
[52] U.S. Cl. ................................... 525/420; 525/427; 525/428; 525/434; 525/934; 428/458; 428/460; 427/458; 427/459; 427/485; 427/435
[58] Field of Search ................ 525/428, 427, 420, 434

[56] References Cited

U.S. PATENT DOCUMENTS 2,244,183  6/1941  Austin ................................ 525/428

FOREIGN PATENT DOCUMENTS 0007623  2/1980  European Pat. Off. .
0195377  9/1986  European Pat. Off. .
0212085  3/1987  European Pat. Off. .
2358287  6/1974  Germany .
49-23836  6/1974  Japan ................................ 525/428

OTHER PUBLICATIONS

Patent Abstracts of Japan. vol. 7, No. 289 (JP58-168656) Dec. 1983.

*Primary Examiner*—Ana L. Carrillo
*Attorney, Agent, or Firm*—Doane, Swecker & Mathis Burns

[57] ABSTRACT

Thermoplastic powders well adapted for the direct adherent coating of metal substrates, i.e., without requiring an intermediate adherence primer layer, are based on a polyamide and/or a polyetheresteramide, and contain an effective amount of a polycondensate of an aromatic sulfonamide with an aldehyde or dicarboxylic acid.

10 Claims, No Drawings

THERMOPLASTIC POLYAMIDE/POLYETHERESTERAMIDE POWDERS FOR THE DIRECT COATING OF METAL SUBSTRATES

This application is a continuation of application Ser. No. 07/815,847, filed Dec. 31, 1991, now abandoned which is a continuation of application Ser. No. 07/191,871, filed May 9, 1988, now abandoned.

BACKGROUND OF THE INVENTION

1Field of the Invention

The present invention relates to novel thermo-plastic powder compositions based on polyamides and/or polyetheresteramides, and to the use of such thermoplastic powders for the coating of metal substrates without requiring adherent primer layers.

2. Description of the Prior Art

Polyamides are currently used for the coating of metal substrates, particularly in view of their good mechanical properties, such as resistance to abrasion, impact strength, etc., and their chemical inertness to numerous materials, such as hydrocarbons, bases, inorganic acids, and the like.

It is known to this art, however, that the adherence of polyamides to metals is insufficient as a result of the poor wettability of polyamides in the molten state, which does not permit them to penetrate into the roughness and interstices of the metal in order to provide mechanically strong adherence. Also, if a polyamide powder is deposited uniformly onto a metal surface and the deposit heated to melting at the appropriate temperature, the molten polyamide film shrinks and forms droplets which may fall from the metal support.

To overcome this shortcoming, the metal support is coated with an intermediate layer, designated the adherence primer layer, intended to ensure the attachment and mechanical anchoring of the polyamide powder to the substrate. Typically, the adherence primer layer is based on thermosetting resins and is applied in the form of a powder, or in solution or suspension in organic solvents.

It is thus necessary to supply additional equipment and processing for the possible elimination of solvents and the curing of the primer layer prior to the coating of the primed substrate with the polyamide powder. Furthermore, the curing and/or drying of the primer appreciably prolongs the duration of the coating operations and, hence, their cost.

In French Patent No. 72/41,484 powder compositions are described based on polyamides and containing blocked phenols; they do not require an adherence primer layer.

However, the conditions of the application thereof are delicate and do not enable obtaining highly effective adherent bonding, although bonding strengths are indeed improved.

SUMMARY OF THE INVENTION

Accordingly, a major object of the present invention is the provision of thermoplastic powder coating compositions based on polyamides and/or polyetheresteramides which improvedly wet metal substrates and do not require an intermediate adherence primer layer.

Briefly, the thermoplastic powder coating compositions according to the invention comprise a mixture of a polyamide and/or a polyetheresteramide and condensation resins of aromatic sulfonamide compounds and aldehydes and/or dicarboxylic acids.

DETAILED DESCRIPTION OF THE PREFERRED EMBODIMENTS OF THE INVENTION

More particularly according to the present invention, the ratio by weight of the condensation resins to the polyamide and/or polyetheresteramide advantageously ranges from 0.5 to 20% and preferably from 0.5 to 10%.

The polyamides comprising the thermoplastic powder of the invention are aliphatic polyamides produced from lactams or aminoacids, the hydrocarbon chain of which contains a number of carbon atoms ranging from 4 to 20, such as, for example, caprolactam, oenantholactam, dodecalactam, undecanolactam, 11-aminoundecanoic acid, 12-aminododecanoic acid, the condensation products of a dicarboxylic acid with a diamine, such as, for example, the nylons 66, 69, 610, 612 and 96 (products of the condensation of hexamethylene diamine with adipic acid, azelaic acid, sebacic acid, 1,12-dodecanedioic acid and of nonamethylene diamine with adipic acid), the copolyamides produced by the polymerization of various monomers and mixtures of a plurality of the above polyamides.

Among the above polyamides, the following are particularly preferred:

(i) polyamide 11, produced by the polycondensation of 11-aminoundecanoic acid;

(ii) polyamide 12, produced by the polycondensation of 12-aminododecanoic acid or dodecanolactam; and (iii) the copolyamides produced by the polymerization of the aforesaid monomers.

In general, the inherent viscosity (measured at 20° C. on a solution of 0.5 g of polymer per 100 g meta-cresol) of the polyamides ranges from 0.20 to 2.0, preferably from 0.60 to 1.30 dl g$^{-1}$.

Other suitable polyamides include the amorphous semi-aromatic polyamides and in particular those described in published French Applications Nos. 1,588,130, 2,324,672 and 2,575,756, in EP 53,876 and in Japanese Patents Nos. 59/015,447 and 60/217,237.

The polyetheresteramides also include both statistical polyetheresteramides (i.e., formed by the random linkage of different monomer components) and the sequenced polyetheresteramides, i.e., formed by blocks containing a certain chain length of their different constituents.

The polyetheresteramides are the products of copolycondensation of polyamide sequences with reactive end groups with sequences of polyethers with reactive end groups, such as, for example:

polyamide sequences with dicarboxylic end groups, with sequences of polyetherdiols.

Such polymers are described, for example, in French Patents Nos. 74/18,913 and 77/26,678, hereby expressly incorporated by reference.

The number average molecular weight of the polyamide sequences typically ranges from 500 to 10,000, and more preferably from 600 to 5,000. The polyamide sequences of the polyetheresteramides are preferably the nylons 6, 66, 612, 11 or 12, or copolyamides produced by the polycondensation comonomers thereof.

The number average molecular weight of the polyethers advantageously ranges from 200 to 6,000 and preferably from 600 to 3,000.

The polyether sequences preferably comprise polytetramethylene glycol (PTMG), polypropylene glycol (PPG) or polyethylene glycol (PEG).

The inherent viscosity of the polyetheresteramides advantageously ranges from 0.8 to 2.05 and preferably from 0.80 to 1.20 dl g$^{-1}$.

The inherent viscosity is measured in meta-cresol at 25° C., with an initial concentration of 0.5 g of polymer per 100 g meta-cresol. It is expressed in dl g$^{-1}$.

The polyetheresteramides according to the invention may comprise 5% to 85% by weight polyether and 95% to 15% by weight polyamide and preferably from 30% to 80% by weight polyether and 70% to 20% by weight polyamide.

The condensation resins comprising the powder compositions of the invention may be produced by the condensation of aromatic sulfonamide compounds and aldehydes and/or dicarboxylic acids. The melting point of the condensation resins according to the invention preferably ranges from 50° to 180° C., and their dynamic viscosity at 100° C. advantageously ranges from 10 Pa.s to 50 Pa.s.

The aromatic sulfonamide compounds are selected from among the monosulfonamide derivatives of benzene, whether or not halogenated, of nitrobenzene, o-, m- or p-toluene, xylene, substituted or unsubstituted naphthalene, methyl or ethyl ethers of phenol, cresol, resorcinol, naphthol.

Exemplary of the aldehydes, acetaldehyde, benzaldehyde, furfural and formaldehyde are representative, preferably formaldehyde.

Exemplary of the dicarboxylic acids are adipic acid, iso- and terephthalic acids, undecanedioic acid, oxalic acid, as are the corresponding acyl chlorides thereof.

In the mixtures of the invention, various other components may be incorporated, such as fillers, pigments, hardening or crosslinking agents, and the like.

Exemplary of the fillers that may be added to the compositions according to the invention are talc, calcium and manganese carbonates, potassium and aluminum silicates, etc.

Exemplary of the pigments are titanium dioxide, strontium chromate, zinc phosphate, lead silicochromate, carbon black, iron oxides, etc.

And exemplary of the hardening or crosslinking agents are isocyanate compounds, phenolic ether resins, etc.

It is possible to incorporate into the subject mixtures of polyamide and/or polyetheresteramide and polycondensation resins up to 100% by weight of the different components selected from among those described above, with their proportions remaining within the limits typically encountered in the field of powder compositions based on polyamide or polyetheresteramide which are used for the coating of metal substrates.

This invention also features several processes for producing the thermoplastic powder coating compositions described above.

The first process includes:
(a) dissolving the condensation resin in an appropriate solvent;
(b) next adding to the solution prepared in this manner, the polyamide and/or the polyetheresteramide; and
(c) finally, drying and screening the mixture to produce a powder composition of the grain size distribution desired.

All of these stages may be carried out at ambient temperature.

The solvent in which the condensation resin is dissolved is advantageously acetone, ethanol, or any other solvent in which the solubility of the resin is high and which may easily be eliminated by conventional techniques.

The second process for producing the powder compositions according to the invention includes mixing together, in the molten state, the condensation resin with the polyamide, in a mixer of appropriate type.

The temperature of the mixing process may range from 150° to 300° C., preferably from 170° to 230° C.

The mixture obtained in this manner is generally present in the form of granules, which are ground by the usual methods to the grain size distribution desired for the coating of the metal substrate.

The third process includes mixing together, in the dry state, the finely ground condensation resin and the polyamide powder. This dry mixture or dry blend does not require any special apparatus and may be carried out at ambient temperature; it is, therefore, economical and rapid.

The fourth process for producing the powder composition according to the invention includes a copolycondensation of the polyamide monomers and the monomers constituting the condensation resin, as hereinabove described. One embodiment of this process includes polycondensing the polyamide monomers in the presence of the condensation resin (already polycondensed).

This process is generally carried out at a temperature of from 150° to 300° C., preferably from 190° to 250° C.

Any type of apparatus used for the polycondensation of the polyamides may advantageously be employed. For example, a reactor equipped with means for an agitation of approximately 50 rpm and capable of withstanding a pressure of 20 bars may be used.

The duration of the polycondensation may range from 5 to 15 hours, preferably from 4 to 8 hours.

Upon completion of the polycondensation operations, a mixture in the form of granules, which are ground to the grain size distribution desired, is obtained.

In general, the grain size distribution of the powders according to the invention ranges from 5 $\mu$m to 1 mm.

The present invention also features the use of the thermoplastic powder compositions described above for adherently coating metal substrates.

The metal substrate may be selected from a wide range of materials. It may be a piece of ordinary or galvanized steel, a piece of aluminum or of an aluminum alloy. The thickness of the metal substrate is immaterial (for example, on the order of a tenth of a millimeter or on the order of several tens of cm).

According to a known technique which in itself is not an object of this invention, the metal substrate, and in particular ordinary steel, aluminum or aluminum alloys, may be subjected to one or more of the following preliminary surface treatments, with this list not being exclusive:
Coarse degreasing;
Alkaline degreasing;
Brushing;
Fine degreasing;
Hot rinsing;
Phosphating degreasing;
Iron or zinc phosphatation;
Cold rinsing;

Chromium rinsing.

Exemplary of the metal substrates well adapted for coating with a composition according to the invention, the following are representative:

(1) Degreased steel, whether smooth or peened with shot;
(2) Degreased and phosphated steel;
(3) Iron or zinc phosphated steel;
(4) Sendzimir galvanized steel;
(5) Electronic coated steel;
(6) Bath galvanized steel;
(7) Cataphoretically coated steel;
(8) Chromated steel;
(9) Anodized steel;
(10) Corundum sand blasted steel;
(11) Degreased aluminum;
(12) Aluminum, whether smooth or peened with shot;
(13) Alodine 1200 aluminum.

The compositions based on polyamides and/or polyetheresteramides according to the invention are thus applied, in the form of powder, to the metal substrate. The application of the powder composition may be carried out by conventional technique.

The powders may be ground in cryogenically cooled apparatus or those providing for the strong absorption of air (blade, hammer, disk grinders, etc.). The powder particles obtained are selected in appropriate manner to eliminate the grain size fractions that are undesirable; for example, excessively coarse or fine particles.

Among the suitable methods for the application of the powder, representative are electrostatic projection and immersion in a fluid bed, each of which is a particularly preferred process for the coating of a metal substrate according to the invention.

In electrostatic projection, the powder is introduced via a gun, and is entrained by compressed air therein and passed into a nozzle charged with a high voltage, generally from tens to one hundred kilovolts.

The applied voltage may be of positive or negative polarity.

The flow rate of the powder in the gun generally ranges from 10 to 200 g/min and preferably from 50 to 120 g/min.

During its passage through the nozzle, the powder is charged with a certain amount of electricity and the powder particles entrained by the compressed air are applied to the metal surface to be coated, said surface itself being grounded, i.e., at zero voltage. The powder particles are retained on the surface by their electrostatic charge and the forces of electrostatic attraction are sufficient such that the powder coated substrate may not only be coated with the powder, but also placed into a furnace at a temperature effecting the fusion or crosslinking of the coating powders.

The polarity of the electrostatic charge applied to the powder may be, as mentioned above, positive or negative.

In general, it is selected as a function of the nature of the powder to be applied, which may yield good results with a polarity of a certain sign and poorer or no results with a polarity of the opposite sign.

Typically, positive polarity provides better results in the application of nylon 11 or 12 by electrostatic projection.

However, it has now unexpectedly been determined that in the use of the powder compositions according to the invention based on polyamides and containing a condensation resin of the sulfonamide/aldehyde or dicarboxylic acid type, negative polarity provides better results, in particular relative to adherence and the quality of the final coating than positive polarity, regardless of the amount of the condensation resin incorporated into the composition.

The electrostatic projection of the compositions of the invention having negative polarity has a certain advantage, as the majority of standard industrial electrostatic installations for the electrostatic projection of powder coatings are designed to operate with negative polarity. The compositions according to the invention may therefore be used in such installations without the need for substantial modifications.

In electrostatic projection, the preferred weight ratio of the condensation resins in the polyamide and/or polyetheresteramide mixture advantageously ranges from 1.5 to 7.5%.

In general, a powder having a mean particle size of from 5 to 100 $\mu$m and preferably from 5 to 65 $\mu$m, may be used.

The coatings with any of the compositions according to the invention and applied by electrostatic projection are strongly adherent and have a high quality final appearance, regardless of the thickness of the coating ranging from 40 to 400 $\mu$m.

It will be appreciated that this is not the case for powder coatings based on polyamide alone, which exhibit numerous defects in appearance, whether in small or large thicknesses.

By "small thicknesses" are intended thicknesses of approximately 40 $\mu$m and "large thicknesses" are on the order of 400 $\mu$m.

In small thicknesses, polyamide coatings exhibit, for example, pits, while, with large thicknesses, there is a great risk of delamination and bubbles and repulsion mole-casts appear in great numbers.

In the case of immersion in a fluid bed, the metal substrate to be coated, carefully prepared, for example by subjecting it to one or more of the aforementioned surface treatments, is heated in a furnace to a temperature determined in respect of the nature of the substrate, its form and the thickness of the desired coating. The substrate heated in this manner is then immersed in a powder composition according to the invention, maintained in suspension by a gas circulating in a vessel via an apertured base. The powder melts in contact with the hot metal surface, thereby forming a deposit, the thickness of which is a function of the temperature of the substrate and the duration of its immersion in the powder.

In the process of immersion in a fluidized bed, the preferred proportion of the condensation resin relative to the polyamide and/or polyetheresteramide advantageously ranges from 0.5% to 3%. It has also unexpectedly been determined that the presence of the condensation resin in the mixture appreciably improves the fluidization of said mixture in the immersion vessels.

The grain size distribution of the powders used in the fluid beds advantageously ranges from 10 to 1,000 $\mu$m and preferably from 80 to 200 $\mu$m.

Generally, the thickness of the coating may range from 150 to 1,000 $\mu$m, preferably from 200 to 700 $\mu$m.

In order to further illustrate the present invention and the advantages thereof, the following specific examples are given, it being understood that same are intended only as illustrative and in nowise limitative.

EXAMPLE 1

(A) PREPARATION OF THE POWDER COMPOSITION:

To 100 parts by weight of acetone, 5 parts were added of the resin produced by condensation of toluene sulfonamide and formaldehyde, the melting point of which was 62° C. and its dynamic viscosity at 100° C. was equal to 10 Pa.s. Subsequently, 200 parts of nylon 11 powder were added, the same having an inherent viscosity of 0.90 dl g$^{-1}$ and containing 13% by weight of different additives, 9.6% of which was a filler, 1.8% a colorant and 1.6% of antioxidant, anti-pitting and reducing agents. The mixture was agitated continuously for 4 min at ambient temperature. A thick paste was obtained, which was dried in a furnace for 6 h at 45° C. to eliminate the acetone.

The dry residue was pulverized and screened through a screen with a 100 μm mesh to eliminate the coarse particles which did not correspond to the electrostatic grain size range.

(B) APPLICATION OF THE COATING:

The powder composition obtained under (A) was deposited at ambient temperature onto a steel plate preliminarily treated by zinc phosphating, by electrostatic projection under a negative electrostatic charge of 30 kV, the metal surface being at 0 voltage.

The substrate coated in this manner was placed in a furnace heated to 220°±20° C. and retained there for 5 to 15 min, then removed from the furnace and cooled in air.

(C) MATERIAL CHARACTERISTICS:

(1) The material was a composite successively comprising:
  (i) the zinc phosphated steel plate (thickness 1.5 mm);
  (ii) an adherent layer of the powder composition described in (A) having a thickness of 95 μm.

(2) The material described in (C) (1) above was subjected to the following adherence test, developed by the present inventors:
  (a) With a cutting tool, two parallel grooves were scratched in the coating down to the metal, said grooves being spaced apart 10 mm. Subsequently, another groove was scored perpendicularly to the first two and intersecting them.
  (b) Using the same tool, the cutting width of which was 10 mm, the last groove was penetrated and the cut continued between the two parallel grooves at the level of the metal/coating interface to obtain a tongue of the coating of 10 mm.

Tension was applied to the tongue in an attempt to separate the coating from the metal.

The results are classified in the following manner:
Class 4: the film cannot be separated from the metal;
Class 3: the film separates irregularly, the bond is complete over less than 50% of the surface;
Class 2: the film separates regularly, the force required for tearing off the coating is high and is at the limit of the tensile strength of the coating;
Class 1: the film separates easily from the surface, the bond is weak;
Class 0: the coating is not bonded to the surface at all.

The results obtained utilizing the material of (C) (1) above are reported in Table I.

EXAMPLE 2

The experiment of Example 1 was repeated, using a mixture containing (by weight):

(i) 100 parts acetone;
(ii) 5 parts of resin of the condensation of toluene sulfonamide and formaldehyde, having the characteristics described in Example 1 (A):
(iii) 200 parts of nylon 12 powder, having an inherent viscosity of 0.95 dl g$^{-1}$.

A composite material was obtained, comprising in succession:
  (a) a zinc phosphated steel plate having a thickness of 1.5 mm;
  (b) a layer of nylon 12 having a thickness of 100 μm.

The material described above was subjected to the adherence test of Example 1 (C) (2).

The results are reported in Table I.

EXAMPLE 3

(A) PREPARATION OF THE POWDER COMPOSITION:

25 parts by weight of the condensation resin of toluene sulfonamide and formaldehyde having characteristics identical to those of Example 1 (A), previously ground to a mean particle size distribution of from 30 to 40 μm, were added to 1,000 parts of a nylon 11 having an inherent viscosity of 0.90 dl g$^{-1}$ and containing 0.7% by weight of an anti-pitting and antioxidant agent.

The combination was mixed together and homogenized at a temperature of from 200° to 220° C. The retention time in the mixing apparatus was on the order of 45 sec.

The product obtained, after cooling in air, was ground to produce a powder having a grain size distribution of from 10 to 65 μm.

(B) APPLICATION OF THE COATING:

The powder composition obtained in (A) was electrostatically projected onto a degreased and phosphated steel plate under the conditions described in Example 1 (B).

(C) MATERIAL CHARACTERISTICS:

(1) The material was a composite comprising, in succession:
  (i) a degreased and phosphated steel plate (thickness 1.5 mm);
  (ii) a layer of the powder composition described under (A), having a thickness of 100 μm.

(2) The material described under (C) (1) above was subjected to the adherence test described in Example 1 (C) (2).

The results obtained using the materials described in (C) (1) are reported in Table I.

EXAMPLE 4

(A) PREPARATION OF THE POWDER COMPOSITION:

20 parts of the resin produced by polycondensation of toluene sulfonamide/formaldehyde, having the characteristics described in Example 1 (A) were ground to a grain size of from 100 to 1,000 μm prior to adding same to 1,000 parts by weight of 11-aminoundecanoic acid, 10 parts by weight hypophosphorous acid and 100 parts of a filler.

The entire mass was placed in a reactor under a stream of nitrogen and agitated. The mixture was heated to a temperature of 190° C. under a pressure of 10 bars.

The temperature and the pressure were maintained constant until the viscous mass had a degree of polymerization DP equal to 70.

After 8 hr, the product was extruded and ground to a grain size distribution of from 5 to 65 μm.

(B) APPLICATION OF THE COATING:

The powder composition obtained in (A) was projected electrostatically onto a degreased, smooth steel plate under the conditions described in Example 1 (B).

(C) MATERIAL CHARACTERISTICS:

(1) The material was a composite, comprising in succession:
(i) a degreased, smooth steel plate (thickness 1.5 mm);
(ii) a layer of the powder composition described in (A); thickness of 100 μm.

EXAMPLE 5

(A) PREPARATION OF THE POWDER COMPOSITION:

Into a HENSCHEL type rapid mixer having a capacity of 70 l were introduced 20 kg nylon 11 powder, 0.30 kg of the toluene sulfonamide/formaldehyde condensation resin ground to a mean particle size of 13 μm, and 0.02 kg of a fluidizing agent.

The nylon 11 had an inherent viscosity of 0.90 dl g$^{-1}$ and it contained 13% by weight of additives, 9.6% of which was filler, 1.8% a colorant and 1.6% antioxidant, anti-pitting and reducing agents.

The condensation resin had a melting point of 62° C. and its dynamic viscosity at 100° C. was 10 Pa.s.

The mixture was agitated for 100 sec at a velocity of 830 rpm. The powder obtained may be used as is.

(B) APPLICATION OF THE COATING:

The powder composition obtained in (A) was projected electrostatically onto a degreased, smooth steel plate under the conditions described in Example 1 (B).

(C) MATERIALS CHARACTERISTICS:

(1) The material was a composite, containing in succession:
(i) the smooth, degreased steel plate (thickness 1.5 mm);
(ii) a layer of the powder composition described in (A), thickness 90 μm.

(2) The material described in (C) (1) above was subjected to the adherence test as described in Example 1 (C) (2).

The results obtained using the material described in (C) (1) are reported in Table I.

EXAMPLE 6 (COMPARATIVE)

(1) A nylon 11 powder was projected electrostatically onto a degreased, smooth steel plate under the conditions of Example 1 (B), the powder having the same characteristics as described in Example 5 (A) and a mean particle size of 35 μm.

(2) The material produced was a composite, comprising in succession:
(i) the degreased, smooth steel plate (thickness 1.5 mm);
(ii) the nylon 11 powder layer having a thickness of 100 μm.

(3) The material described under (2) was subjected to the adherence test as described in Example 1 (C) (2).

The results obtained are reported in Table I.

EXAMPLE 7 (COMPARATIVE)

(1) A powder composition based on nylon 11 was projected electrostatically onto a degreased, smooth steel plate, under the conditions of Example 1 (B), said powder having properties identical with those described in Example 5 (A) and containing 13.5% by weight of blocked phenol resins.

(2) The material produced was a composite, comprising in succession:
(i) the degreased, smooth steel plate (thickness 1.5 mm);
(ii) a layer of the powder composition described in (1); thickness 100 μm.

(3) The material described in (2) was subjected to the adherence test described in Example 1 (C) (2).

The results obtained are reported in Table I.

EXAMPLE 8

The experiment of Example 5 was repeated, under the same conditions, using the nylon 11 powder having the same characteristics, but containing different additives.

A—The powder contained:
(i) 99.25% by weight nylon 11;
(ii) 0.75% of additives (antioxidant, antipitting agent, fluidizing agent).

B—The powder, white in color, contained 68.8% by weight nylon 11, 29.5% fillers and 1.7% additives (antioxidant and anti-pitting agent).

C—The powder, black in color, contained 58.5% by weight nylon 11, 39% fillers, 0.5% black colorant, 2% additives (antioxidant, anti-pitting agent, adhesive agent).

D—The powder, gray in color, contained 85% by weight nylon 11, 13.4% fillers, 0.02% colorants and 1.28% additives (antioxidant, anti-pitting agent).

E—The powder, yellow in color, contained 67.4% by weight nylon 11, 1.7% colorants and 2% additives (antioxidant, anti-pitting agent, reducing agent).

F—The powder, beige in color, contained 83.8% by weight nylon 11, 9.3% fillers, 5.7% colorants and 1.2% additives (antioxidant, anti-pitting agent).

The results obtained in the experiments A to F are reported in Table II.

EXAMPLE 9

The experiment of Example 5 was repeated under identical operating conditions, using a gray colored nylon 11 powder, containing 13% by weight additives, including fillers (9.6%), colorants (1.8%), an antioxidant+anti-pitting agent reducing agent (1.6%) (SPECIMEN A).

The experiment described above was repeated, but with powder compositions respectively containing 0.1 kg condensation resin (SPECIMEN B), 0.3 kg resin (SPECIMEN C), 0.9 kg resin (SPECIMEN D) and 1.5 kg resin (SPECIMEN E) having the same characteristics as in 5 (A).

The adherence of the composite materials after 15 days storage in ambient air at 25° C. was tested.

The results obtained are reported in Table III.

EXAMPLE 10

A—The powder composition prepared in Example 5 was used; it was projected electrostatically by means of a low flow rate gun (10 g/min) onto a metal specimen of the dimensions 200×200×1 mm, located at a distance of approximately 15 cm from the nozzle of the gun. The limiting thickness of the coating, beyond which defects appear, was measured.

B—As a comparison, a powder composition based on nylon 11 having an inherent viscosity of 0.90 dl g$^{-1}$ and containing 13.5% by weight blocked phenolic resin, was applied under the conditions described in A. The limiting thickness of the coating, beyond which defects, in particular pits, appear, was measured.

The results obtained are reported in Table IV.

EXAMPLE 11

A—The powder composition prepared in Example 5 was projected electrostatically by means of a high flow rate gun (120 g/min) onto a metal specimen with the dimensions of 200×200×1 mm, located at a distance of approximately 15 cm from the nozzle of the gun.

The limiting thickness of the coating, beyond which defects (bubbles, repulsion moles) appear, was measured.

B—As a comparison, under the conditions described in A, a powder composition based on nylon 11 having an inherent viscosity of 0.90 dl g$^{-1}$ and containing 13.5% by weight blocked phenolic resin, was applied. The limiting thickness of the coating, beyond which defects appear, was measured.

The results obtained are reported in Table IV.

EXAMPLE 12

A—The powder composition obtained in Example 9 (SPECIMEN C) was applied electrostatically to different metal substrates under the operating conditions described in Example 1 (B).

B—As a comparison, nylon 11 powder having an inherent viscosity of 0.90 dl g$^{-1}$ was applied electrostatically under the same conditions.

C—As a comparison, a powder composition based on nylon 11 having an inherent viscosity of 0.90 dl g$^{-1}$ and containing 13.5% by weight blocked phenolic resin was applied electrostatically and under the same conditions.

The results of Experiments A, B and C are reported in Table V.

EXAMPLE 13

Test of separation prior to fusion:

A metal specimen with dimensions of 200×200×1 mm was weighed prior to the coating of one side with powder by electrostatic projection. The specimen coated in this manner was subsequently weighed and the weight of the powder deposited determined.

The specimen was placed perpendicularly on a support and fixedly maintained at 285 mm from a hammer having a weight of 50 g, which was suspended from the end of a 265 mm rod located 20 mm from the plate. Five minutes after the application of the powder, the specimen was subjected to the impact of the hammer, which described a circular arc of 45° and struck the specimen in its center on the uncoated side.

The dislodged powder was measured after the impact.

The loss percentage upon dislodgement was then calculated. It was equal to: Loss of weight=[(weight of powder dislodged)/(weight of powder deposited)]×100.

The dislodgement test described above was carried out using a nylon 11 powder having an inherent viscosity of 0.90 dl g$^{-1}$ containing 13% by weight of additives, 9.6% of which were fillers, 1.8% colorant and 1.6% antioxidant, anti-pitting and reducing agents (SPECIMEN A).

The same dislodgement test was carried out using a mixture of nylon 11 powder having the same characteristics as in A and containing 13.5% by weight of blocked phenolic resin (SPECIMEN B).

This same test was also performed using a mixture of nylon 11 powder containing 1.5% by weight of toluene sulfonamide/formaldehyde resin having a melting point of 62° C. and a dynamic viscosity at 100° of 10 Pa.s (SPECIMEN C).

The results of Specimens A, B and C are reported in the following table:

| Specimen | Weight loss (%) |
| --- | --- |
| A | 13 |
| B | 13.5 |
| C | 1.5 |

EXAMPLE 14

In a fluid immersion vessel, a powder having a mean grain size distribution of from 80 to 200 μm was introduced.

This powder was fluidized by the introduction of compressed gas under the perforated plate of the vessel.

The shot-peened steel substrate to be coated was preheated in an aerated furnace until it reached a temperature of approximately 240°–260° C.

The substrate was immersed in the bath of the fluidized powder for 4 to 6 sec, then withdrawn and allowed to cool to ambient temperature.

Nylon 11, white nylon 11 and nylon 12 powders (respectively Specimens A, B and C), containing varying amounts of toluene sulfonamide/formaldehyde condensation resins having a melting point of 62° C. and a dynamic viscosity at 100° C. of 10 Pa.s, were used.

The adherence of the coatings produced was measured after 15 days in ambient air by the test described in Example 1 (C) (2).

The results are reported in Table VI.

EXAMPLE 15

Into a stainless steel fluidizing vessel with dimensions of 500×500×700 mm and fitted with a perforated plate of sintered bronze, 40 kg powder was introduced. The powder was fluidized maximally in 1 min by means of an air flowmeter graduated in m$^3$/h and having a flow rate range of 3 to 30 m$^3$/h.

The fluidization was discontinued slowly to a value of 0 and the height of the powder was measured at rest. This height was adjusted to 350 mm by the addition or removal of powder.

The powder was then refluidized maximally to the zone of brisk ebullition.

The flow of air was reduced to 28 m$^3$/h, the powder permitted to stabilize and the pressure was noted on a water manometer consisting of a U-tube and graduated in mm of water.

The same measurements were carried out by each time reducing the flow rate by 2 m$^3$/h to 20 m$^3$/h, then by 1 m$^3$/h to 1 m$^3$/h.

It was then possible to plot the curves of fluidization pressure as a function of the flow of air and determine the zone enabling immersion corresponding to moderate ebullition over the entire surface.

If the above method is applied to a nylon 11 powder containing no condensation resin according to the invention, the immersion zone ranges from 18 to 21 m$^3$/h of air, while for a nylon 11 powder containing the condensation resin according to the invention, the immersion zone is lowered and ranges from 9 to 12 m³/h of air.

TABLE I

| Example | Adherence | Condenstion resin PA + additives (% by weight) | Preparation of powder | Type of application |
|---|---|---|---|---|
| 1 | Class 2 | 2.5 | dissolution | ES(−) |
| 2 | Class 3 | 2.5 | dissolution | ES(−) |
| 3 | Class 3 | 2.5 | mixing in the molten state | ES(−) |
| 5 | Class 3 | 1.5 | dry mixing | ES(−) |
| 6 | Class 0 | 0 |  | ES(−) |
| 7 | Class 2 | 0 but contained 13.5% by weight blocked phenolic resin | dry mixing | ES(−) |

ES = electrostatic projection
(+)
(−)

TABLE II

| Example | Adherence | % by weight of additives | Condensation resins PA-11 + additives (% by weight) | Type of application |
|---|---|---|---|---|
| 8.A | Class 2 | 0.75 | 1.5 | ES(−) |
| 8.B | Class 3 | 31.2 | 1.5 | ES(−) |
| 8.C | Class 3 | 41.5 | 1.5 | ES(−) |
| 8.D | Class 2 | 14.7 | 1.5 | ES(−) |
| 8.E | Class 3 | 32.6 | 1.5 | ES(−) |
| 8.F | Class 3 | 16.2 | 1.5 | ES(−) |

TABLE III

| Example | Adherence after 15 days of storage in ambient air | Condensation resins PA + additives (% by weight) | Type of application |
|---|---|---|---|
| 9.A | Class 1 | 0 | ES(−) |
| 9.B | Class 2 | 0.5 | ES(−) |
| 9.C | Class 3 | 1.5 | ES(−) |
| 9.D | Class 4 | 3.5 | ES(−) |
| 9.E | Class 3 | 7.5 | ES(−) |

TABLE IV

| | COATING THICKNESS | |
|---|---|---|
| | lower limit Example | upper limit Example |
| PA-11 + 1.5% condensation resin | 10.A 40 μm | 11.A 350 μm |
| PA-11 + 13.5% blocked phenolic resin | 10.B 70 μm | 11.B 110 μm |

TABLE V

| | Adherence | | |
|---|---|---|---|
| Substrate | Example 12.A | Example 12.B | Example 12.C |
| degreased steel F₂C=CHF | Class 2 | Class 0 | Class 2 |
| degreased steel, shot-peened | Class 4 | Class 1 | Class 2 |
| degreased steel, phosphated | Class 3 | Class 0 | Class 1 |
| steel, iron phosphated | Class 3 | Class 0 | Class 1 |
| steel, zinc phosphated | Class 3 | Class 0 | Class 1 |
| degreased aluminum | Class 4 | Class 0 | Class 1 |

TABLE VI

| Condenstion resin PA + additives (% by weight) | Adherence Example 14.A PA-11 | Adherence Example 14.B PA-11, white | Adherence Example 14.C PA-12 |
|---|---|---|---|
| 0 | Class 1 | Class 1 | Class 2 |
| 0.5 | Class 3 | Class 4 | Class 3 |
| 1.5 | Class 3 | Class 3 | Class 4 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermoplastic powder composition of matter comprising particulates of at least one polyamide, polyetheresteramide, or mixture thereof, and an adhesion promoting amount of the polycondensate of an aromatic sulfonamide with an aldehyde or dicarboxylic acid, said composition being well adapted for the direct adherent coating of metallic substrates wherein said adhesion promoting amount is from 0.5% to 20% by weight of said thermoplastic powder.

2. The thermoplastic powder as defined by claim 1, having a particle size distribution ranging from 5 μm to 1 mm.

3. The thermoplastic powder as defined by claim 1, comprising from 0.5% to 10% by weight of said polycondensate.

4. The thermoplastic powder as defined by claim 1, essentially consisting of particulates of nylon 11 and said polycondensate.

5. The thermoplastic powder as defined by claim 1, essentially consisting of particulates of nylon 12 and said polycondensate.

6. The thermoplastic powder as defined by claim 1, essentially consisting of a polyamide and said polycondensate.

7. The thermoplastic powder as defined by claim 1, essentially consisting of a polyetheresteramide and said polycondensate.

8. The thermoplastic powder as defined by claim 6, said polyamide having an inherent viscosity, measured at 20° C. on a solution of 0.5 g of polymer per 100 g meta-cresol, ranging from 0.20 to 2.0 dl g$^{-1}$.

9. The thermoplastic powder as defined by claim 7, said polyetheresteramide having an inherent viscosity ranging from 0.8 to 2.05 dl g$^{-1}$.

10. The thermoplastic powder as defined by claim 1, wherein said polycondensate of an aromatic sulfonamide with an aldehyde or dicarboxylic acid is condensed prior to contact with said at least one polyamide, polyetheresteramide, or mixture thereof.

* * * * *